United States Patent [19]
Loane

[11] 3,939,356
[45] Feb. 17, 1976

[54] HYDRO-AIR STORAGE ELECTRICAL GENERATION SYSTEM

[75] Inventor: Edward S. Loane, Reading, Pa.

[73] Assignee: General Public Utilities Corporation, Reading, Pa.

[22] Filed: July 24, 1974

[21] Appl. No.: 491,222

[52] U.S. Cl. .................... 290/52; 290/54; 60/398
[51] Int. Cl.² ...................................... F03B 13/105
[58] Field of Search ............ 290/52, 54, 43; 60/398, 60/652, 698

[56] References Cited
UNITED STATES PATENTS

| | | | |
|---|---|---|---|
| 1,247,520 | 11/1917 | Fessenden | 60/398 |
| 2,962,599 | 11/1960 | Pirkey | 290/54 |
| 3,523,192 | 8/1970 | Lang | 290/54 |
| 3,538,340 | 11/1970 | Lang | 290/54 |
| 3,755,076 | 8/1973 | Lindsley | 29/52 |

OTHER PUBLICATIONS

Olsson, E.K.A., "Air Storage Power Plant," Mechanical Engineering, Nov. 1970, Vol. 92, No. 11.

Primary Examiner—Robert K. Schaefer
Assistant Examiner—John J. Feldhaus
Attorney, Agent, or Firm—Brumbaugh, Graves, Donohue & Raymond

[57] ABSTRACT

A hydro-air storage system for generating electricity in which a subterranean reservoir containing water is pressurized and the water is pumped to a surface reservoir during periods when the demand for electricity is low and in which water from the surface reservoir flowing into the subterranean reservoir and compressed air released from the subterranean reservoir are both utilized to generate electricity during periods when the demand for electricity is high.

10 Claims, 2 Drawing Figures

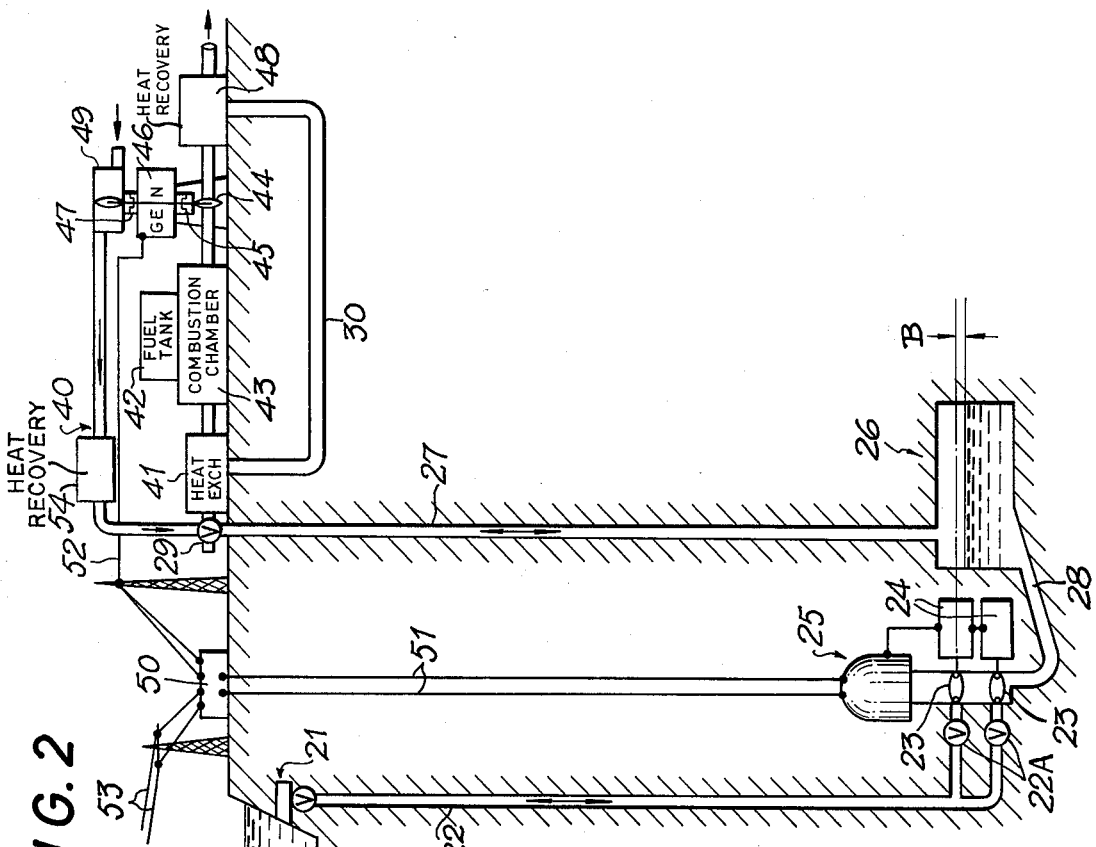
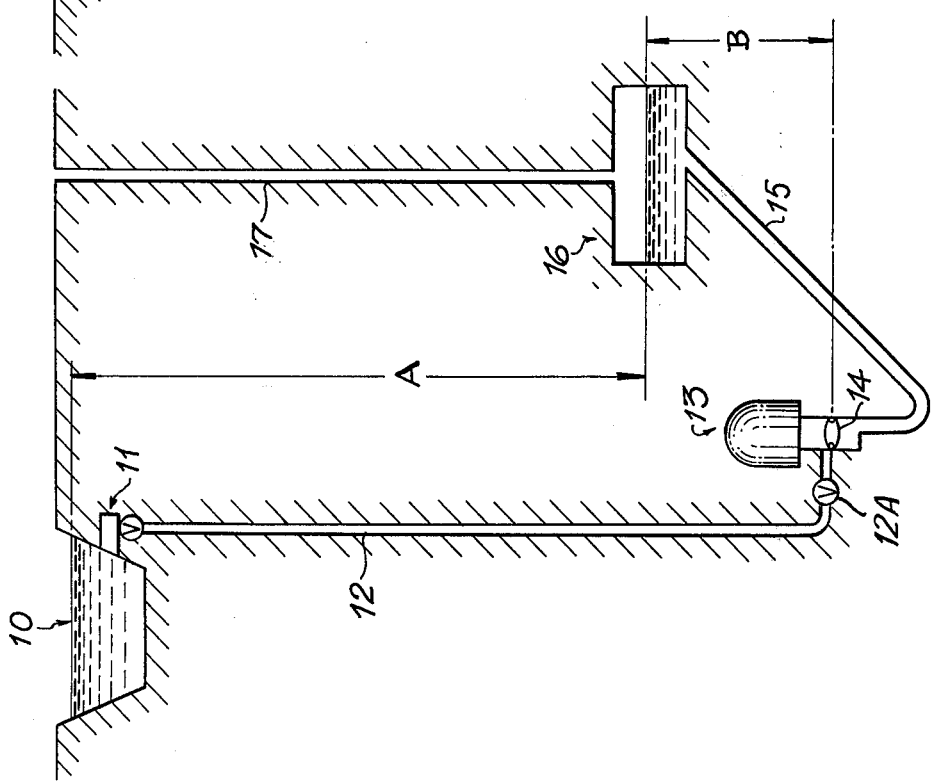

3,939,356

HYDRO-AIR STORAGE ELECTRICAL GENERATION SYSTEM

BACKGROUND OF THE INVENTION

This invention relates to the generation of electricity and, more particularly, to the generation of electricity by a combination water and compressed air storage system.

An underground hydro-pumped storage project may be of interest where topography precludes the above-ground construction of two reservoirs of suitable size, difference in elevation and proximity to each other. An underground lower reservoir can then take the place of one above-ground reservoir, if suitable geology makes the required excavation possible and economic. Because that part of the output capacity related to a given volume of excavation is a direct function of the developed head (difference in elevation), the under-ground reservoir will usually be placed as deep as plant equipment and optimized design will permit.

In a hydro-pumped storage system for intermittently generating electricity, such as that described in U.S. Pat. No. 1,247,520, a surface water reservoir is connected by a vertical conduit to an excavated subterranean power plant. Water from the surface reservoir flows through turbines of the power plant and electricity is produced. After leaving the turbines the water is stored in an excavated subterranean reservoir. An air vent is usually provided to allow air to flow to and from the underground reservoir to equalize the pressure. Also, the reservoir is normally located above the generator in order to avoid cavitation and to assure satisfactory operation of the turbines and pumps. Later, wind or electricity during low demand periods can be used to pump the water back to the surface reservoir. This removal of the water from the subterranean reservoir draws air down the vent to replace the water.

Constant pressure stored-air systems, such as the one described in U.S. Pat. No. 3,538,340, may also be used for the intermittent supply of electricity. In this type of system, water from a surface reservoir is connected to the underside of an excavated subterranean reservoir, which contains compressed air. A shaft connects the compressed air at the top of the subterranean reservoir with an air motor or other auxiliary prime mover which, in turn, drives generating equipment to produce electricity. As the compressed air in the subterranean reservoir is forced to the surface and is used in a turbine to drive an electric generator, a constant pressure is maintained on the air by water entering the subterranean reservoir from the surface reservoir. Thus, the air pressure in the subterranean reservoir is maintained essentially constant and is determined by the hydrostatic head, i.e. difference in elevation, between the surface reservoir and the subterranean reservoir. During low demand periods electrically driven air compressors at the surface deliver compressed air to the subterranean reservoir. This compressed air displaces the water and forces it to return to the surface reservoir.

In U.S. Pat. No. 2,433,896 a combined water and air storage system is described. In this system there is a first subterranean reservoir for storing combustible gas and a second subterranean reservoir for storing air. The surface reservoir is connected through a conduit to a pump-turbine also located on the surface. Other conduits lead from the pump-turbine to the bottom portions of the two subterranean reservoirs. Conduits also lead from the top of the two subterranean reservoirs to air compressors and air turbines located on the surface. During periods of high load, the water pump is activated to pump water from the surface reservoir into the two subterranean reservoirs. This causes air to be forced out of one subterranean reservoir and gas to be forced out of the second subterranean reservoir, whereupon they are combined and injected into a combustion turbine to drive an electrical generator. During periods of low load, the air compressors compress the air and gas and inject them into their respective subterranean reservoirs. Water in the subterranean reservoirs is forced through the hydrostatic head to the surface reservoir. In passing from the subterranean reservoirs to the surface reservoir the water passes through a turbine for generating electrical power.

The disadvantage with this combined system is that only the combustion turbine generates electricity during peak periods, and during low load periods the air compressors must use enough power to recharge the subterranean reservoirs and force the water to the surface reservoir through a turbine, which generates electricity at a time when it is less needed.

SUMMARY OF THE INVENTION

The present invention is directed to providing electricity during peak load times through the simultaneous use of stored water and air.

In an illustrative embodiment of the invention, a penstock connects a surface reservoir for water to a subterranean power plant which includes a hydroelectric generator and a water pump. The hydroelectric generator has at least one turbine that may be reversible to act as the water pump or the turbine may be connected to the water pump through a common shaft. After the water from the surface reservoir leaves the turbines, it is passed by a conduit to the bottom of a subterranean reservoir. The top part of the subterranean reservoir si filled with compressed air which is directed to a surface power plant. The surface plant includes a combustion turbine generator and an air compressor on a common shaft.

During periods of peak demand for electricity, water is released from the surface reservoir into the penstock. On reaching the subterranean power plant the water drives the turbines of the hydroelectric generator and produces electricity. On leaving the turbines the water enters the subterranean reservoir displacing a portion of the compressed air. The compressed air is then forced to the surface where it is passed through a heat exchanger and mixed with fuel in combustion chambers of the surface power plant. The hot pressurized gas then drives one or more combustion-turbines and exhausts through heat recovery equipment to the atmosphere. During electrical generation the combustion-turbine is uncoupled from the air compressor, but drives an electric generator. Once the operation has begun the pressure on the compressed air in the subterranean reservoir is maintained substantially constant to produce the desired tailwater pressure on the hydroelectric turbine by controlling either or both the release of air that is to be used in the combustion turbines or the water used in the hydroelectric turbines.

During the off-peak hours the system is reversed. In particular, the electric generators of the subterranean power plant act as motors and drive the water pumps which displace the water from the subterranean reservoir to the surface reservoir. In addition, the electric generators at the surface power plant are operated as motors, which are uncoupled from the turbines, but drive the air compressors. The compressors force air through heat exchangers that cool it, down the air shaft to the subterranean reservoir. The rate of air compression is controlled in relation to the rate of water pumping so that the resulting air pressure maintains the desired positive suction head on the water pumps.

One of the features of this combined system is the savings in time and cost over the construction of two separate systems, since the underground reservoir of the hydro plant also acts as the reservoir for the air plant. Also, unlike the system described in U.S. Pat. No. 2,433,896, the present system generates electricity only during the peak hours when it is most needed.

BRIEF DESCRIPTION OF THE DRAWINGS

The foregoing and other features of the present invention will be more readily apparent from the following detailed description and drawings in which:

FIG. 1 is a piror art hydro pumped storage system and

FIG. 2 is an illustrative embodiment of the present invention.

DESCRIPTION OF AN EXEMPLARY EMBODIMENT

The conventional hydro-pumped storage system depicted in FIG. 1 has a surface reservoir 10 with its associated outlet and control structures 11. Whenever electricity is to be generated by the system, water passes from reservoir 10 through the outlet 11 and into penstock 12. Control valve 12a permits the water to enter a reversible turbine-pump 14 of a subterranean power plant 13. As the water under the pressure created by the hydrostatic head A turns the turbine, electrical power is generated. On leaving the power plant the water is conducted through conduit 15 to the bottom of a subterranean reservoir 16. Air stored in the top of the reservoir is displaced through air shaft 17 to the surface. When electrical power is not being supplied to a distribution system, such as during low demand periods, the system is reversed with turbine 14 acting as an electrically driven pump to return the water from underground reservoir 16 to surface reservoir 10.

The reservoir 16 is located above the level of the power plant 13 in order to provide a required positive head B on the turbines and pumps. In installations in which the head A is large, the head B may be on the order of 200 feet. In effect, the head B provides a large positive tail water pressure on the turbine and a high positive suction head on the pump. This is necessary in order to avoid cavitation and to assure satisfactory operation of the turbine and pump.

The hydro-air storage system of the present invention is illustrated in FIG. 2. This system has a surface reservoir 20 connected with a subterranean power plant 25 by an outlet control unit 21 and a penstock 22. The water in penstock 22 contacts turbine-pump units 23, which may be either reversible pump-turbines or separate pumps and turbines on single shafts. In practice there may be a number of the units 23, each supplied by a branch of penstock 22 with its own valve 22A. The turning of the turbines by the water causes electrical generators 24 to produce electric power which is delivered to a surface power distributor 50 through wires 51.

Water leaving the power plant 25 is directed to the bottom of a subterranean reservoir 26 by one or more conduits 28. Compressed air is stored in the area above the water in reservoir 26 and the entry of the water into the reservoir 26 causes this air to be forced to a surface power plant 40 through air shaft 27. At the surface the compressed air passes through a valve 29 to heat exchanger 41 where it is heated. On leaving the heat exchanger 41 the air is mixed in combustion chambers 43 with fuel from storage tank 42. The hot pressurized gas then drives one or more combustion-turbines 44 and exhausts through heat recovery equipment 48 to the atmosphere. The heat recovery unit may be connected to the heat exchanger 41 through a conduit 30 so that the heat removed in unit 48 can be used to heat the compressed air in unit 41. When clutch 45 is engaged the turbine drives an electric generator 46 which supplies electrical power to power distributor 50 over wires 52. Clutch 47, which connects the air compressor 49 to the driven shaft, is disengaged at this time.

The electrical power from power plants 25 and 40 is combined in power distributor 50 and is supplied to the power network over lines 53. With this combination of plants it is possible to generate more power for the same storage volume than the simple hydro plant of FIG. 1, e.g. 50 to 100% more or less. This increase in power is achieved with practically the same excavation costs since only the surface plant 40 is added. However, if a given generating capacity is desired a smaller underground reservoir would be needed with the present invention and there is a resulting cost savings.

In off peak hours the system is reversed with unit 23 acting as a pump to return the water to surface reservoir 20. This is normally achieved by drawing power from the network through lines 51 and 53, and using genertor 24 as an electrical motor. Acting as a motor, generator 24 will drive the turbine as a pump or will drive a pump connected on the same shaft. In addition, electrical power is taken from the network over lines 52 in order to drive generator 46 as a motor. At that point clutch 45 is disengaged and clutch 47 of air compressor 49 is engaged. The compressor 49 takes air from the atmosphere, compresses it and delivers it to heat recovery unit 54 where the air temperature is reduced prior to storage. The cooled air then moves through valve 29 and conduit 27 into the underground reservoir 26. In this manner both air and water are stored for future use in generating electricity.

As was mentioned in connection with FIG. 1 it is important for the proper functioning of the hydraulic devices that a high positive pressure exist in the conduits connecting the underground reservoir and the subterranean power plant. In FIG. 1 this is achieved by placing the reservoir above the pumps and turbines of the underground power plant. However, in such a system any water leakage due to equipment malfunction, improper operation, earthquake, etc. will flow into the powerhouse and must be drained to a sump. Therefore, sump pumps of large capacity would be required to return the leakage to the lower reservoir so that reasonably safe operation could be expected. In those situations where the pumps could not handle the leakage, flooding would result and it could take some time to restore the plant because of the relatively large size of the lower reservoir.

In the system of the present invention shown in FIG. 2 the positive pressure on the water is created at least partially by the compressed air and, therefore, the head B can be reduced or even made negative, depending on the positive pressure required and the pressure supplied by the compressed air. While this allows the reservoir to be below the generator floor, it is still possible for leakage into the power house to occur since the water is under pressure. Normally such leakage can be handled by sump pumps. However, if the pumps should prove insufficient, flooding can be prevented by rapidly reducing the air pressure. The reduction in air pressure can be accomplished by opening appropriate relief valves, such as valve 29, and discharging the pressure in reservoir 26 to the atmosphere. Even if some flooding does occur, it will only be temporary because the water that enters the power plant can drain into the lower reservoir by gravity, as soon as the air pressure drops sufficiently. Consequently, repair operations can begin almost at once.

Using electricity from the network to recharge the system is the most reliable method; but, it is also possible to use wind power or other sources of intermittent power to perform this function. In addition, the combustion turbines of FIG. 2 can be replaced with an air motor driven by compressed air alone, thereby eliminating the fuel requirement.

While the invention has been particularly shown and described with reference to preferred embodiments thereof, it will be understood by those skilled in the art that various changes in form and details may be made therein without departing from the spirit and scope of the invention.

I claim:

1. A hydro-air storage system for generating electricity comprising:
   a surface reservoir containing water;
   a subterranean hydroelectric power plant;
   a penstock connecting said surface reservoir with said hydroelectric power plant;
   a subterranean reservoir having an upper region containing compressed air and a lower region containing water;
   a conduit connecting the lower water containing region of said subterranean reservoir with said hydroelectric power plant;
   a surface power plant for generating electrical power from compressed air; and
   an air shaft connecting the upper compressed air region of said subterranean reservoir with said surface power plant, whereby water from the surface reservoir flows through the subterranean power plant to generate electricity and compressed air is forced through the surface power plant by the water to generate electricity.

2. A hydro-air storage system as claimed in claim 1 in which substantially all of the water region of the subterranean reservoir is below the level of the subterranean hydroelectric power plant.

3. A hydro-air storage system as claimed in claim 2 wherein said subterranean hydroelectric power plant comprises
   turbine means connected to a branch of said penstock for producing rotary motion in response to the flow of water in said penstock;
   first generator means for producing electricity in response to the rotary motion of said turbine means;
   first motor means for producing rotary motion in response to an electrical current; and
   pump means for pumping water in said penstock to said surface reservoir in response to the rotary motion of said motor means, thereby generating electricity when the water turns the turbine and restoring the water to the surface reservoir when electricity drives the pump.

4. A hydro-air storage system as claimed in claim 3 wherein said surface power plant is a combination combustion turbine generator and air compressor.

5. A hydro-air storage system as claimed in claim 4 wherein said surface power plant comprises
   a heat exchanger connected to said air shaft for heating compressed air forced out of the air shaft;
   a fuel supply;
   a combustion chamber for mising the air from the heat exchanger and the fuel;
   a combustion turbine means for producing rotary motion in response to the flow of hot gases from said combustion chamber;
   second generator means for producing electricity in response to the rotary motion of said combustion turbine means;
   second motor means for producing rotary motion in response to an electrical current; and
   air compressor means for injecting compressed air into said air shaft in response to the rotary motion of said second motor means, thereby generating electricity when the water forces the compressed air into the surface plant and restoring the compressed air to the subterranean reservoir when electricity drives the compressor.

6. A hydro-air storage system as claimed in claim 5 further including:
   a first heat recovery means for cooling the gases leaving said turbine means and delivering the cool gases to the atmosphere, said first heat recovery means supplying heat to said heat exchanger to heat the air forced from said air shaft; and
   a second heat recovery means for cooling the gases leaving said air compressor prior to injecting the gases into said air shaft.

7. A hydro-air storage system as claimed in claim 5 wherein said first generator means and said first motor means are parts of a first motor-generator unit, said turbine means and pump means are parts of a reversible turbine-pump and said second generator means and said second motor means are parts of a second motor-generator unit.

8. A hydro-air storage system as claimed in claim 5 further including a safety valve on said air shaft adapted to connect the air shaft to the atmosphere on command.

9. A hydro-air storage system as claimed in claim 1 wherein the maximum water level in said subterranean reservoir is lower than the generator floor of said subterranean power plant.

10. A hydro-air storage system for generating electricity, comprising:
    a surface reservoir for water with suitable outlet and control structures;
    a subterranean combination hydroelectric generator and water pump plant having at least one generating unit, each generating unit having a hydrualic unit comprising a pump and turbine;
    a penstock connecting said surface reservoir with each hydraulic unit of said subterranean plant;
    a subterranean reservoir for air and water;

a conduit connecting the bottom of said subterranean reservoir with the hydraulic units of said subterranean plant;

a surface combination combustion turbine generator and air compressor plant; and an air shaft connecting the top of said subterranean reservoir with said surface plant.

* * * * *

UNITED STATES PATENT OFFICE
CERTIFICATE OF CORRECTION

Patent No. 3,939,356          Dated February 17, 1976

Inventor(s) Edward S. Loane

It is certified that error appears in the above-identified patent and that said Letters Patent are hereby corrected as shown below:

Col. 2, line 39, "si" should read --is--;

Col. 3, line 21, "piror" should read --prior--;

Col. 4, line 36, "genertor" should read --generator--;

Col. 6, line 15, "mising" should read --mixing--;

Col. 6, line 64, "hydrualic" should read --hydraulic--.

Signed and Sealed this

Eighteenth Day of January 1977

[SEAL]

Attest:

RUTH C. MASON
*Attesting Officer*

C. MARSHALL DANN
*Commissioner of Patents and Trademarks*